(12) United States Patent
Webb et al.

(10) Patent No.: US 9,327,385 B2
(45) Date of Patent: May 3, 2016

(54) NEAR-NET CUTTING TOOL INSERT

(71) Applicants: Steven W Webb, Woodlands, TX (US); Gerold Weinl, Alvsjo (SE); Malin Martensson, Nacka (SE); Thomas C Easley, Bexley, OH (US)

(72) Inventors: Steven W Webb, Woodlands, TX (US); Gerold Weinl, Alvsjo (SE); Malin Martensson, Nacka (SE); Thomas C Easley, Bexley, OH (US)

(73) Assignee: Diamond Innovations, Inc., Worthington, OH (US)

( * ) Notice: Subject to any disclaimer, the term of this patent is extended or adjusted under 35 U.S.C. 154(b) by 0 days.

(21) Appl. No.: 13/731,151

(22) Filed: Dec. 31, 2012

(65) Prior Publication Data
US 2013/0167447 A1    Jul. 4, 2013

Related U.S. Application Data

(60) Provisional application No. 61/581,664, filed on Dec. 30, 2011.

(51) Int. Cl.

| | | |
|---|---|---|
| B24D 3/00 | (2006.01) | |
| B24D 3/02 | (2006.01) | |
| B24D 11/00 | (2006.01) | |
| B24D 18/00 | (2006.01) | |
| C09K 3/14 | (2006.01) | |
| B24D 3/28 | (2006.01) | |
| B01J 3/06 | (2006.01) | |
| C04B 35/52 | (2006.01) | |
| C04B 35/5831 | (2006.01) | |
| C04B 35/645 | (2006.01) | |
| C22C 26/00 | (2006.01) | |
| B22F 5/00 | (2006.01) | |
| B22F 9/02 | (2006.01) | |
| C04B 35/626 | (2006.01) | |
| C22C 21/00 | (2006.01) | |

(52) U.S. Cl.
CPC ............. *B24D 18/0009* (2013.01); *B01J 3/062* (2013.01); *B22F 5/00* (2013.01); *B22F 9/026* (2013.01); *B24D 3/00* (2013.01); *B24D 3/28* (2013.01); *C04B 35/52* (2013.01); *C04B 35/5831* (2013.01); *C04B 35/62655* (2013.01); *C04B 35/62695* (2013.01); *C04B 35/645* (2013.01); *C22C 26/00* (2013.01); *B01J 2203/063* (2013.01); *B01J 2203/066* (2013.01); *B01J 2203/0645* (2013.01); *B01J 2203/0655* (2013.01); *B22F 2005/001* (2013.01); *B22F 2207/01* (2013.01); *B22F 2998/10* (2013.01); *C04B 2235/3217* (2013.01); *C04B 2235/3826* (2013.01); *C04B 2235/3843* (2013.01); *C04B 2235/3865* (2013.01); *C04B 2235/3873* (2013.01); *C04B 2235/3886* (2013.01); *C04B 2235/402* (2013.01); *C04B 2235/427* (2013.01); *C04B 2235/428* (2013.01); *C04B 2235/5436* (2013.01); *C04B 2235/5445* (2013.01); *C04B 2235/604* (2013.01); *C04B 2235/608* (2013.01); *C04B 2235/77* (2013.01); *C04B 2235/80* (2013.01); *C04B 2235/94* (2013.01); *C04B2235/9638* (2013.01); *C22C 21/00* (2013.01); *C22C 2026/003* (2013.01); *C22C 2026/005* (2013.01); *C22C 2026/007* (2013.01)

(58) Field of Classification Search
USPC .................................. 51/298, 293, 307, 309
See application file for complete search history.

(56) References Cited

U.S. PATENT DOCUMENTS

| | | | | |
|---|---|---|---|---|
| 3,909,991 | A * | 10/1975 | Coes, Jr. ............... | C09K 3/1418 264/122 |
| 4,647,546 | A * | 3/1987 | Hall, Jr. ............... | C04B 35/5831 501/96.3 |
| 6,287,489 | B1 * | 9/2001 | Rolander ............ | C04B 35/5831 264/6 |
| 6,676,893 | B2 * | 1/2004 | Rolander ................ | C22C 1/051 419/13 |
| 7,772,517 | B2 * | 8/2010 | Glynn ..................... | B23B 27/14 219/69.17 |
| 2002/0112408 | A1 * | 8/2002 | Rolander ................ | C22C 1/051 51/307 |

* cited by examiner

FOREIGN PATENT DOCUMENTS

CN          1269273 A      10/2000

*Primary Examiner* — James McDonough
(74) *Attorney, Agent, or Firm* — Keith G. DeMaggio

(57) ABSTRACT

A method of making a near-net superhard material body includes preparing granules from a mixture of superhard powder, binders, and fluids, compacting the granules to form a soft green complex-shaped body, heating the soft green body in a furnace to form a hard green body free from residual binders, embedding one or more of the hard green bodies in a containment powder or a containment means and forming a pressure cell, sintering the cell at high pressure and high temperature, and removing the containment powder from the cell or removing the inserts from the containment means to reveal one or more near-net bodies.

24 Claims, 21 Drawing Sheets

| Cutting plane | Cutting Depth (mm) | Spacing (mm) | Speed (m/s) |
|---|---|---|---|
| 1 | 5 | 10 | 2 |
| 2 | 5 | 10 | 2 |
| 3 | 8 | 16 | 2 |
| 4 | 8 | 16 | 2 |
| 5 | 8 | 16 | 2 |
| 6 | 8 | 16 | 2 |
| 7 | 8 | 16 | 2 |
| 8 | 8 | 16 | 2 |
| 9 | 8 | 16 | 2 |
| 10 | 8 | 16 | 2 |
| 11 | 10 | 20 | 2 |
| 12 | 10 | 20 | 2 |

NEAR-NET CUTTING TOOL INSERT

CROSS-REFERENCE TO RELATED APPLICATION

This application claims the benefit of the U.S. Provisional Application No. 61/581,664, filed Dec. 30, 2011.

TECHNICAL FIELD AND INDUSTRIAL APPLICABILITY

The present disclosure relates to a near-net cutting tool insert, and a method of making a near-net cutting tool insert in a High pressure high temperature (HPHT) process.

Polycrystalline cubic boron nitride (PCBN), diamond and diamond composite materials are commonly used to provide a superhard, superabrasive cutting surface for cutting tools such as those used in mining, metal cutting and drilling operations.

Tools comprising cubic boron nitride, diamond and diamond composite materials are well known in art. Usually, cBN grains are embedded in a binder matrix which may be TiN, TiC or TiCN, for example. Aluminum may also be added, either in metallic form or as an Al-compound such as $Ti_3Al$, $TiAl_3$, TiAl, CoAl, or NiAl.

In one type of diamond composite materials, the diamond grains are embedded in a binder matrix which may be silicon carbide, titanium carbide, or a mixture of carbides for example. The carbides may be formed partly or completely during HPHT. The traditional way to produce such solid bodies may be to load a cavity with powders of desired compositions, optionally to provide an external supply of metal for infiltration into the powders and exposing the cell for high temperature and pressure (HPHT).

There is a need for a method of making superabrasive body which does not require extensive machining to achieve the desired size and shape efficiently and economically.

SUMMARY OF THE INVENTION

In one exemplary embodiment, a method of making a near-net superhard material body may comprise steps of preparing granules from a mixture of superhard powder, ceramic powder and/or metal powder, temporary organic binders, and mixing liquids; compacting the granules to form a soft green body of defined and complex shape; de-binding and pre-sintering the soft green body in a furnace to form a hard green body; embedding one or more of the hard green bodies in a containment powder and compacting the containment powder to form a containment means; sintering the containment cell at high pressure and high temperature; and removing the HPHT sintered near-net bodies from the containment cell.

In another exemplary embodiment, a method of making a near-net superhard material body may comprise steps of mixing powders of cubic boron nitride and aluminum with a temporary organic binder of polyethylene glycol in an ethanol-water mixture to form a slurry; spray drying the slurry to form granules; compacting the granules to maximum green density to form a soft green body; de-binding and pre-sintering the soft green body in a furnace to form a hard green body; embedding the hard green body in a graphite powder and compacting the graphite powder to form a cell; sintering the cell at high pressure and high temperature; and removing the HPHT sintered near-net body from the containment cell to reveal a near-net body.

In another exemplary embodiment, a method of making a near-net superhard material body may comprise steps of mixing powders of diamonds, silicon and silicon nitride with a temporary organic binder of polyethylene glycol in an water mixture to form a slurry; spray the slurry into liquid nitrogen to form granules; freeze dry the granules; compacting the granules to maximum green density to form a soft green body; de-binding and pre-sintering the soft green body in a furnace to form a hard green body; embedding the hard green body together with silicon discs in a graphite powder and compacting the graphite powder to form a cell; sintering the cell at high pressure and high temperature; and removing the HPHT sintered near-net body from the containment cell to reveal a near-net body.

In one exemplary embodiment, the resulting sintered near net body may be essentially free from internal defects (less than about 50 microns by Computer Tomography (CT)) than the standard processed and cut body. Standard processed and cut bodies show internal defects (less than about 50 microns).

In two exemplary embodiments, the performance of the near net bodies is equal or improved compared to standard processed, cut and ground material.

DETAILED DESCRIPTION

Figure 1:
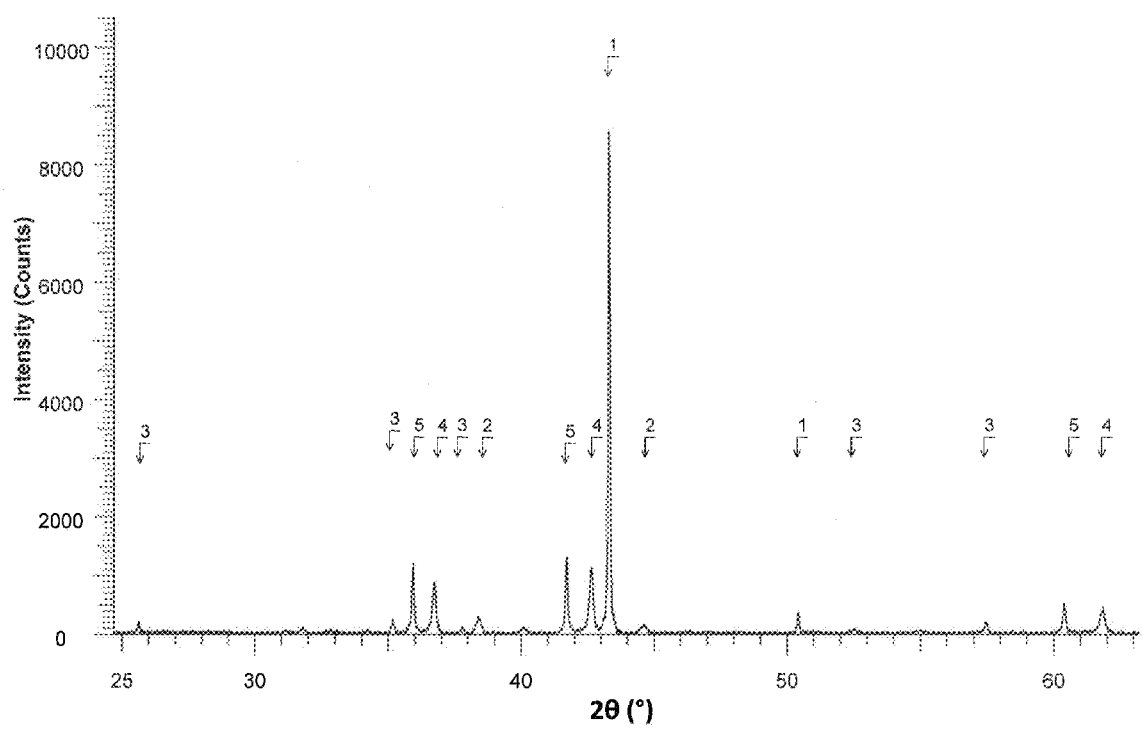
FIG. 1 shows a diffraction pattern for a hard green with composition described in example 1 pre-sintered to about 900° C. according to an exemplary embodiment.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, about 50% means in the range of 45%-55%. As used herein, the term "binder" means a wax or polymer that may be added to the slurry (for spray dry or freeze spray dry) to form granules and which may hold the soft green together after pressing. As used herein, the term "maximum possible green density," means the highest density soft green that can be pressed. It can be seen higher densities of the soft green may lead to less HPHT deformation and best shape control in the final product.

Exemplary embodiments provide a body with desired shapes with an ability to maintain the shape and achieve full density during the HPHT step. Exemplary embodiments may steer the composition after HPHT by carefully monitoring the raw materials, the milling/blending and granulating steps as well as the reactions during pre-sintering. More specifically, exemplary embodiments may minimize the distortion during HPHT by optimizing the green density and strength after compaction and pre-sintering.

In an exemplary embodiment, a method is disclosed for making a near-net superabrasive, such as diamond or cubic boron nitride composite body. The method includes preparing granules from a slurry comprising diamond and/or cubic boron nitride powders and polymeric binders, such as polyethylene glycol (PEG), and optionally metal powders, semi-metal powders, oxide powders, carbide powders, nitride powders, carbonitride powders, carbooxynitride powders and boride powders. When forming CBN or diamond bodies, the starting superhard powders can have a grain size from about 1 µm to about 150 µm and the optional metal, semi-metal, oxide, carbide, nitride, carbonitride, carbooxynitride, and boride powders may have a grain size from about 0.1 to about 25 µm.

To form slurry, a mixing liquid may be required. The milling liquid may be water, alcohol or an organic solvent, or a water and alcohol mixture. Drying of the slurry may be accomplished according to known techniques, in particular spray-drying (SD) or spray freeze drying (SFD). In SD, the slurry containing the powdered materials mixed with the liquid and the organic binder is atomized through an appropriate nozzle in the drying tower where the small drops are instantaneously dried by a stream of hot gas, for instance in a stream of nitrogen, to form agglomerated granules.

In SFD, the slurry is atomized into liquid nitrogen and the granules are instantly frozen and may thereafter be freeze dried. The most common liquid used in SFD is water. The formation of granules is necessary in particular for getting a homogenous distributed raw material, but also to ease the feeding powder into of compacting tools used in the subsequent stage. If needed, dispersing agents, e.g. polyacrylate co-polymers, polyelectrolytes, salts of acrylic polymers, and or a thickening agent such as cellulosic based agent may also be added to the slurry. Dispersing agents are added for controlling the separation of the particles as well as the slurry properties and thus the properties of the resulting granulated powder.

The slurry may be water based or ethanol based. The slurry is granulated using a granulation process such as spray drying or spray freeze drying. In an exemplary embodiment of the present invention, a body may be formed by compaction prior to the sintering step. Pressing agents and the addition of these may be optimized depending on compaction method used. The granulated powder is compacted into a defined shape by a pressing method including uni-axial pressing, multi-axial pressing, or isostatic pressing. When manufacturing powder aimed for uniaxial pressing, the pressing agents may be added to the slurry prior to drying. The pressing agent suitably may be paraffin, polyethylene glycol (PEG), polyvinyl alcohol (PVA), long chain fatty acids for example. The amount of pressing agent is suitably between about 15 and about 25 vol % based on the total dry powder volume. The amount of organic binder is not included in the total dry powder weight.

The compaction step is critical since it creates density gradients in the green which may lead to distortions of the sintered body after the final HPHT step. To minimize these distortions both the green density and compaction method have to be optimized for each powder blend and green body shape. The density may be measured as the relative density compared to the theoretical density of the powder mixture, without the polymeric binder. A typical range of relative density is from about 50% to about 75%. Using higher relative densities, about 60 to about 75%, results in the most uniform near net shape bodies during HPHT sintering. A higher green density gives a higher green strength which gives lower the shrinkage and distortions during HPHT. Compaction may be done in a uniaxial or multi-axial pressing operation known in the art or by using Cold Isostatic Pressing, Powder Injection Molding (PIM), or extrusion depending on the shape of the body to be pre-formed.

Green bodies may be produced in any number of useful sizes, shapes, and geometries. One useful shape may be the shape of a ballistic mining cutter characterized by a cylindrical shank, and conical cutting surface with a spherical tip. Another useful geometry may be the shape of a nozzle body characterized by an outer cylindrical surface and an inner cylindrical surface. Another useful geometry may be the shape of a cutting tool insert.

The organic binders may be removed before the sintering and this may be performed in a fluid gas of air, nitrogen, hydrogen, argon or mixtures thereof at temperatures between about 200° C. to about 600° C., depending on the binder system. The resulting body may at least have enough green strength to hold together, and by monitoring the de-binding conditions the residual amount of carbon and thus the strength of the body may be controlled.

The pre-sintering step may either be a separate process step or be performed as the next step in a single furnace cycle after the de-binding. In one embodiment, the de-bound green body may be placed directly into the HPHT-cell and may be sintered to full density but the degree of distortion of the body is significantly higher than if the green is pre-sintered and the green strength is significantly increased.

The pre-sintering may be conducted in a reactive or non-reactive atmosphere, e.g., under vacuum, in argon, nitrogen, or, hydrogen or a carbon containing gas depending on the material and desired reaction products. During the pre-sintering the metals or semi-metals, e.g., silicon, may partly react to form nitrides and/or carbides which significantly increase the green strength compared with the strength of a de-bound green. The pre-sintering temperature used ranges from about 500° C. to about 1500° C., about 700° C. to about 1300° C. for cBN comprising materials between about 1200° C. to about 1500° C. for the diamond comprising composites. The temperature is maintained for about 1 to about 90 minutes or from about 15 to about 30 minutes, until the entire charge of bodies in the sintering furnace has reached the desired temperature and the desired phase transformation is completed.

The high pressure high temperature (HP/HT) is performed under about 1200 to about 1600° C. and about 20 to about 75 kbar, and may be about 3 GPa for diamond materials and about 5.0 GPa for cBN materials. An external source of metal, such as a silicon in the form of a disc, may be provided adjacent to the hard green for infiltration into the hard green during the sintering process.

In another embodiment of the near-net process, diamond powder may be blended with silicon powder and silicon nitride powder. This mixture is typically known as a diamond feedstock. The diamond powder typically may comprise a blend of diamond powders with different average sizes, such as about 25 microns and about 5 microns. However only one size or a blend of three or more different sizes may be used. The diamond composite is typically made by HPHT sintering of the diamond feedstock at conditions of about 3 GPa and about 1500 to about 1650° C. During the sintering reaction, Si melts and reacts with diamond to form SiC, which forms a continuous matrix bonding the diamonds together in a solid composite. To aid the sintering reaction, additional silicon may be provided adjacent to the diamond feedstock so that it may infiltrate the diamond feedstock during sintering. Diamond composite bodies such as wear parts, wire dies, dressing tools, and mining cutters are typically cut in various shapes and sizes from sintered diamond composite blanks. However, such a process results in significant waste of diamond and incurs substantial fabrication costs.

In one exemplary embodiment, the diamond feedstock is incorporated into a water based slurry along with polymeric binder materials such as polyethylene glycol (PEG). The slurry may be prepared by ball milling, attritor milling, mechanical mixing, ultra sonication, or combinations thereof. The slurry may be used to produce generally spherical granules by a freeze granulation process. Spray freeze drying involves first spraying the slurry through a nozzle forming small liquid droplets. The droplets range in size from about 5 microns to about 700 microns, for example. The droplets may be directed into a container of liquid nitrogen, causing the droplets to instantly freeze into a solid sphere containing the uniformly dispersed diamond feedstock, PEG binder, and ice. The frozen granules may be collected and maintained below about −20° C. to preserve their shape. The ice may be then extracted from the frozen granules using a freeze drying process, producing a solid granule consisting of uniformly dispersed diamond feedstock and polymeric binder. The upper limit of the granule size may be determined by the nozzle diameter and may be generally about 700 microns. The lower limit of the granule size is about 5 microns, and the particle size distribution of the granules may be determined by several factors including the slurry viscosity, spraying speed in ml/min., and the gas pressure supplied to the nozzle to break the slurry spray into droplets.

The spray freeze dried granules may be die-compacted at a pressure of about 150 to about 200 MPa to form a soft green body. The soft green body may be generally of the same geometric form as the desired HPHT sintered product, but with different size or aspect ratio due to the deformation caused by the HPHT sintering process. Complex geometrical features such as holes, angles, curved surfaces, chamfers, indentations, radii, ridges or other features achievable by powder compaction technologies can be produced. Higher density of the soft green may reduce the deformation that occurs during the HPHT sintering process and improve final size and shape control of the final product.

The soft green body is heated to a temperature of about 450° C. to vaporize the polymeric binder. This de-binding operation may be carried out under vacuum conditions, or under flowing hydrogen, nitrogen, air, oxygen, or argon gas, for example. The soft green may then be heat treated further up to about 1300° C. in an inert atmosphere such as vacuum, Ar, or $N_2$ in order to cause a reaction between Si and the diamond to form a small amount of SiC which increases the strength of the green body, forming a hard green body.

One or more of the hard green bodies may be then encased in a containment means, such as compacted graphite powder. One method of encasing the hard green bodies may be to place the hard green(s) onto the punch of a press, pour loose graphite powder around the greens, and apply a pressure of about 175 MPa to compress the graphite powder around the greens. This method may result in a solid graphite containment means with a relative density of about 90%.

Another method of encasing the hard green bodies is to pour loose graphite into a press cavity, and apply pressure of about 175 MPa to compress the powder into a densified body. Cavities matching the size and shape of the hard green may then be machined into the densified graphite body. This method results in a solid graphite containment means with a relative density of about 90%.

Yet another method of encasing the hard green bodies is to provide a set of press punches which contain rods matching the size and shape of the hard green, pouring loose graphite into the press cavity, and apply pressure of about 175 MPa to compress the powder into a densified body. After removal of the compressed body from the punches, the densified graphite body has pre-formed cavities into which the hard greens are inserted. This method results in a solid graphite containment means with a relative density of up to about 100%. The powder chosen for the containment means may be non-reactive with the diamond materials being sintered. For the case of diamond, silicon, and optionally silicon nitride powders, graphite may be a non-reactive containment means. Other powder materials that may be used to form containment means include hexagonal boron nitride, alumina, and talc powders.

A liquid alloy may be infiltrated into the diamond composite body under high temperature. In the method of making diamond composites according to the present invention, an infiltration step is optional. In one embodiment of the present invention a partial infiltration step may be included. In another embodiment of the present invention, no infiltration may take place. If external silicon is used to infiltrate the diamond feedstock during sintering, the silicon may be provided adjacent to the hard greens and incorporated into the containment means along with the hard greens.

Once the hard greens are assembled in the containment means, the containment means is incorporated into a high pressure cell and sintered at HPHT conditions of about 3 GPa and about 1500° C. to about 1650° C. for about 15 to about 30 minutes. After sintering is complete, the graphite containment means may be broken apart with a hammer or other suitable tool and the sintered bodies are separated from the graphite material. A final cleaning of the sintered bodies is completed by grit blasting using a suitable abrasive grit such as SiC or alumina.

Example 1

A near net body of a cBN material were made by mixing and milling 72 wt % cBN, 8 wt % Al, 3.2 wt % $Al_2O_3$, 6.4 wt % TiC and 10.4 wt % substoichiometric TiN in a milling liquid. The powder mixture was pan-dried and then blended with an 82 wt % ethanol 18 wt % water solution and organic binders PEG 300, PEG 1500 and PEG 4000 were added to an amount corresponding to 20 vol % of the dried powder. The slurry viscosity was carefully controlled prior to the spray drying step. The granulated powder had a good flowability and could easily fill a die during the uniaxial pressing step which was performed in a 50 ton Dorset press and the pressing pressure was about 30 kN. The greens were de-bound and pre-sintering in a one step process and the de-binding step was performed during slow ramping under flowing hydrogen up to 500° C. and then followed by pre-sintering under vacuum up to 900° C. with a holding time of 15 minutes.

During the pre-sintering step, the Al was melted and distributed and the hard greens had a density about 2.61 $g/cm^3$+/−0.03 $g/cm^3$ corresponding to 72%+/−1% in relative density. The phases observed in the hard green were shown in the X-ray diffractogram FIG. 1. FIG. 1 shows the diffraction pattern for a hard green with composition described in example 1 pre-sintered to 900° C. The diffractogram was obtained at room temperature using a XPERT-PRO diffractometer using CuKa-radiation. Data were collected between 10 and 70 degrees in two theta with a step size of 0.008 degrees, but in the drawing only the range between 25 to 69 deg in two theta are shown. Background and CuKa2-peaks were subtracted using DIFFRAC Plus Evaluation software. The diffractogram was also corrected for sample displacement using the 111-peak of cBN (PDF No. 00-035-1365) as an internal standard. The reflections in the diffractogram were indexed and the numbers in the drawing corresponds to the following phases: 1=cBN, cubic boron nitride, PDF No. 00-035-1365; 2=Al, Aluminum, PDF No. 00-004-0787; 3=alpha-Al2O3, Corundum, PDF No. 00-046-1212; 4=TiN0.96, Osbornite, PDF No. 01-087-0627; 5=TiC, Khamrabaeuite, PDF No. 00-032-1383.

The greens showed significant strength after pre-sintering and seven hard greens were placed in a die. Graphite powder was poured around them and the graphite was than compacted to form a large cylinder with the hard greens buried inside. The graphite cylinder was placed in a MgO cup and then sintered at 1500-1600° C. under 5 GPa pressure for 30 minutes.

Figure 2A:
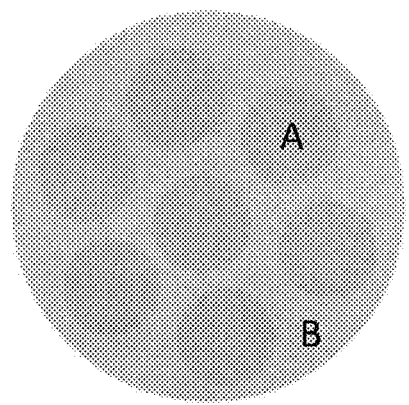
FIG. 2a shows a schematic top view of loading of hard greens described in example 1 prior to high pressure high temperature (HPHT)
Figure 2B:
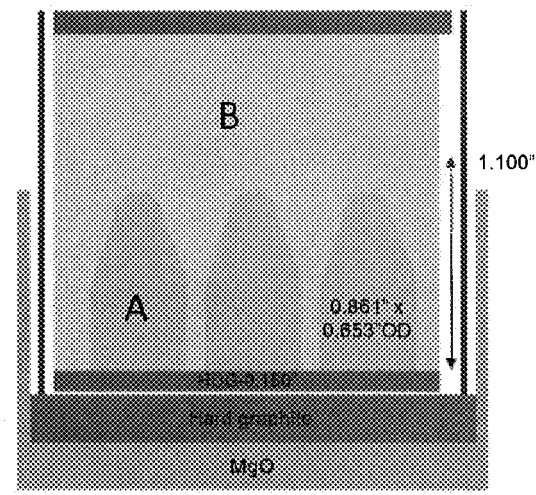
FIG. 2b shows a cross-sectional view of loading of hard greens described in example 1 prior to high pressure high temperature (HPHT)

A description of the loading pattern of the hard greens in the graphite prior to HPHT was shown in FIGS. 2a and 2b prior to HPHT. FIG. 2a showed positions of the seven hard greens (A) buried in pressed graphite powder (B) is shown. In FIG. 2b, a schematic picture showed the same greens (A) from the side buried in pressed graphite powder (B) and with high density graphite placed on top and bottom of the compact. The compact was placed in a MgO cup with hard graphite in the bottom and graphite foil covering the inner diameter of the MgO cup. The dimensions, in inches, of the different parts of the cell were indicated in the right drawing.

Figure 3:
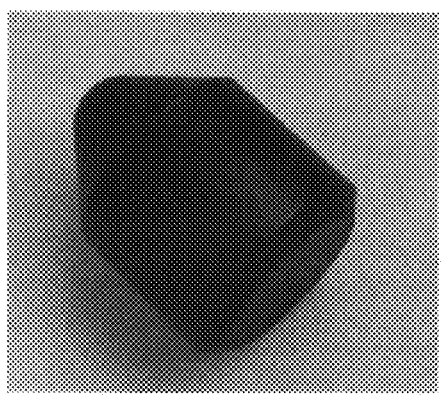
FIG. 3 shows a perspective view of an insert described in Table 1 having been blasted after HPHT to remove graphite residuals according to an exemplary embodiment.

During HPHT, the final densification occurred. The inserts were blasted and the dimensions were measured as shown in table 1 and one of the sintered inserts is shown in FIG. 3.

Table 1, below shows dimensions of the hard green, as well as the five HPHT sintered near-net articles.

TABLE 1

Dimensions before and after HPHT in mm

| Insert | OD (mm) | Top view Roundness (mm) | OD chamfer (mm) | Nose radius (mm) | Side view Chamfer witdth (mm) | Height (mm) |
|---|---|---|---|---|---|---|
| Green | 16.126 | 0.013 | 15.900 | 3.825 | 1.448 | 23.292 |
| 1 | 14.605 | 0.030 | | | | 19.088 |
| 2 | 14.560 | 0.048 | | 3.480 | | 19.075 |
| 3 | 14.605 | 0.046 | | 3.480 | 1.194 | 19.164 |
| 4 | 14.524 | 0.084 | 14.407 | 3.404 | 1.194 | 19.126 |
| 5 | 14.575 | 0.046 | | 3.429 | 1.168 | 19.050 |
| Average | 14.574 | 0.051 | | 3.448 | 1.185 | 19.101 |
| 1st dev | 0.034 | 0.020 | | 0.038 | 0.038 | 0.038 |

Figure 4:
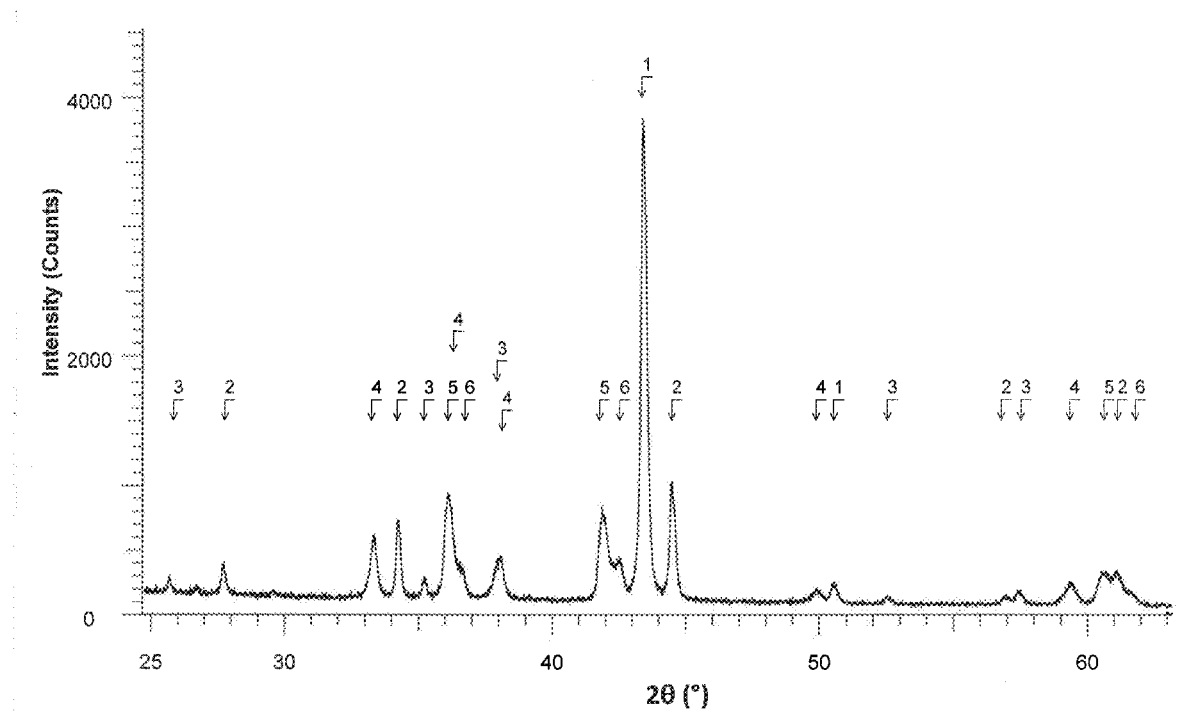
FIG. 4 shows a diffraction pattern for a final sintered insert after HPHT as described in example 1.

The data in table 1 shows densification and slight distortion during the HPHT sintering process. On average, the height of the HPHT sintered bodies shrank from the green state by about twice as much as the outer diameter, and the distortion in roundness increased to about four times of its original value. After HPHT, the sintered density was 3.617 g/cm$^3$ which corresponds to 100% of theoretical density and the phases detected by XRD were cBN, TiB$_2$, Al$_2$O$_3$, AlN, TiC and TiN0.96 as shown in FIG. 4. FIG. 4 shows the diffraction pattern for a final sintered insert after HPHT as described example 1. The diffractogram were obtained at room temperature using a XPERT-PRO diffractometer using CuKa-radiation. Data were collected between 20 and 70 degrees in two theta with a step size of 0.008 degrees, but in the drawing only the range between 25 to 69 deg in two theta are shown. Background was subtracted using DIFFRAC Plus Evaluation software. The diffractogram was also corrected for sample displacement using the 111-peak of cBN (PDF No. 00-035-1365) as an internal standard. The reflections in the diffractogram were indexed and the numbers in the drawing corresponds to the following phases:

1=cBN, cubic boron nitride, PDF No. 00-035-1365

2=TiB2, PDF No. 01-075-0967

3=alpha-Al2O3, Corundum, PDF No. 00-046-1212.

4=AlN, PDF No. 00-025-1133

5=TiC, Khamrabaevite, PDF No. 00-032-1383.

6=TiN0.96, Osbornite, PDF No. 01-087-0627. The position of the reflections was however slightly shifted towards lower two theta indicating slightly larger unit cell dimensions.

Figure 5:
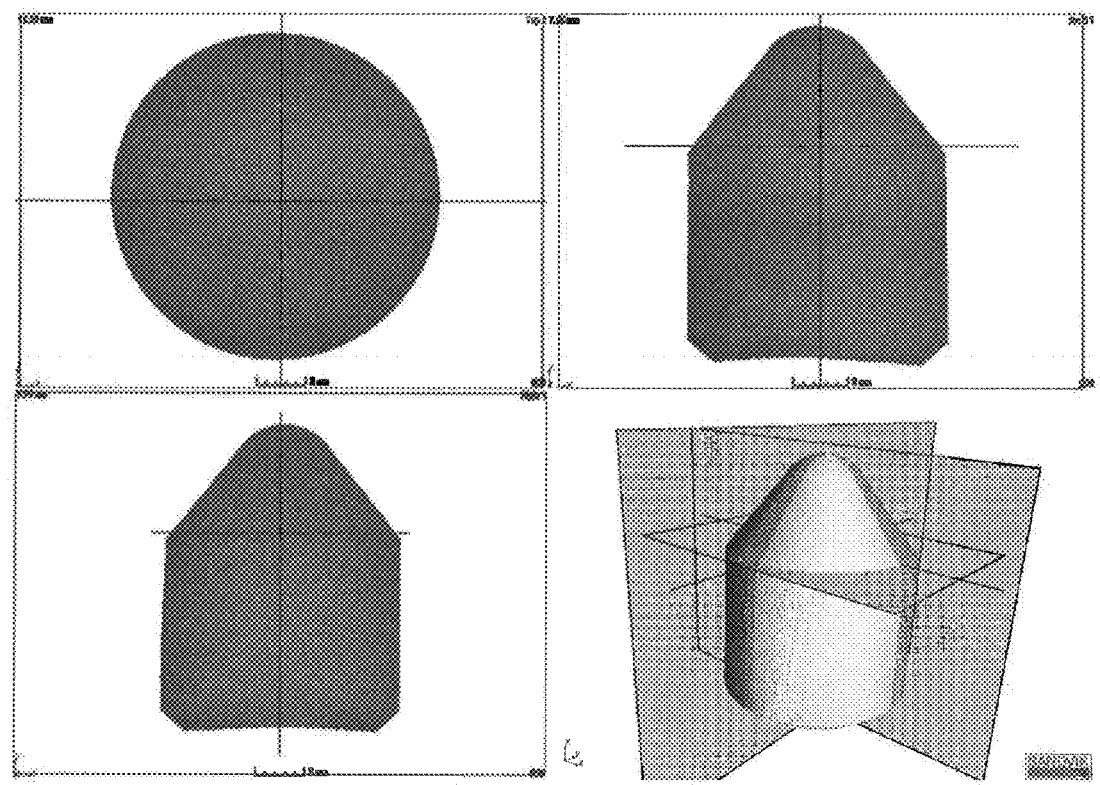
FIG. 5 shows a sintered fully dense body described in example 1 investigated by Computer Tomography (CT) to detect internal defects. The 2D image shows that the body is homogeneous and free from defects >50 microns.

One of these fully dense sintered near net bodies have been investigated in the CT. In a 2D-image (FIG. 5) insert is shown that the body is homogenous and free from defects >50 mu. The CT-system used for these scans were a v|tome|x s240 from GE Sensing and Inspection Technologies, using the following settings:

| CT-scan settings | |
|---|---|
| Magnification | 8.05 |
| Voxelsize (Resolution) | 24.8 μm |
| X-ray voltage | 80 kV |
| X-ray current | 310 μA |
| X-ray filter (Cu) | 0.1 mm |
| Detector timing | 200 ms |
| Detector averaging | 10 |
| Detector skip | 1 |
| Detector sensitivity | 4 |
| Number of projections | 1200 |

After the CT scans were completed, the projections were reconstructed using datos|x 2.0 from GE Sensing and Inspection Technologies, and then analyzed with Volume Graphics StudioMax 2.1.

Example 2

Figure 6:
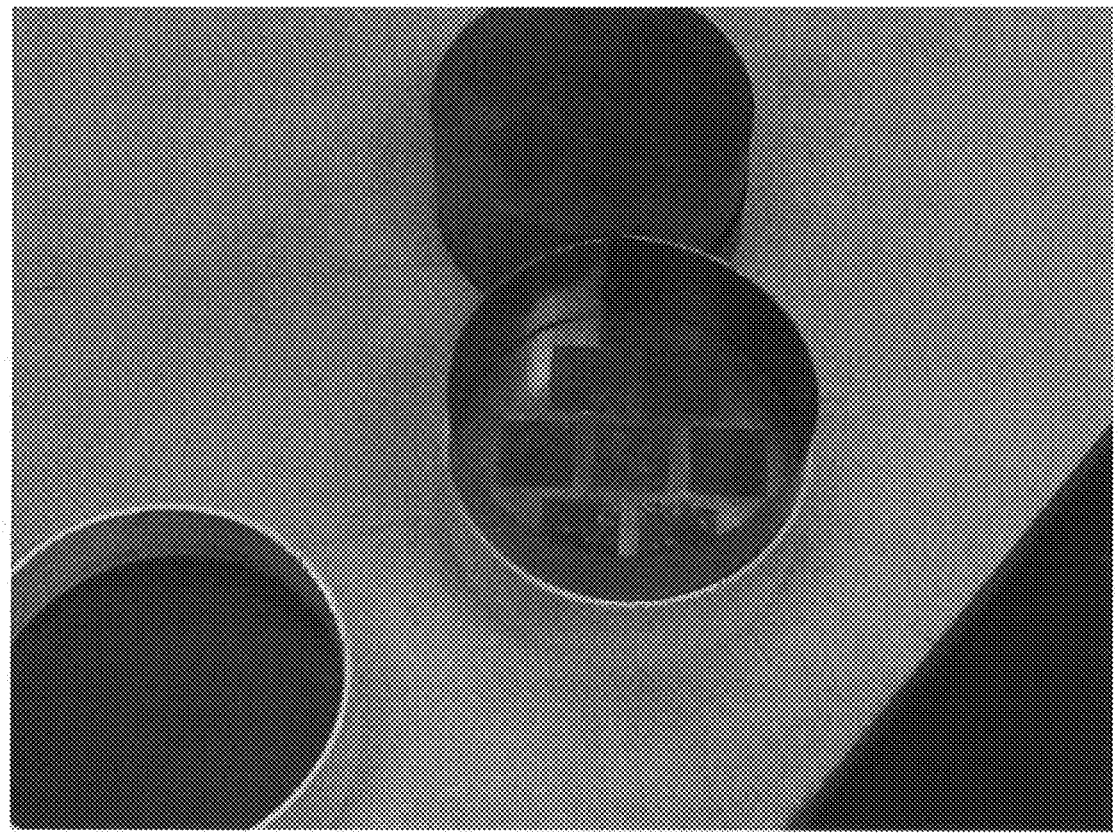
FIG. 6 shows hard greens as in example 2 and 4 pressed into graphite powder, surrounded by a graphite foil and loaded into a MgO-cup prior to HPHT.

From the same powder as described in example 1 bodies in a cutting tool geometry SNMN were pressed to roughly 60% relative density with a thickness=8.016 mm and inscribed circle (IC)=15.712 mm and then pre-sintered in the same way as described in example 1. After pre-sintering, the bodies were pressed into graphite powder and placed in a MgO-container with high density graphite discs below and above and with a MgO lid on top as shown in FIG. 6.

Figure 7:
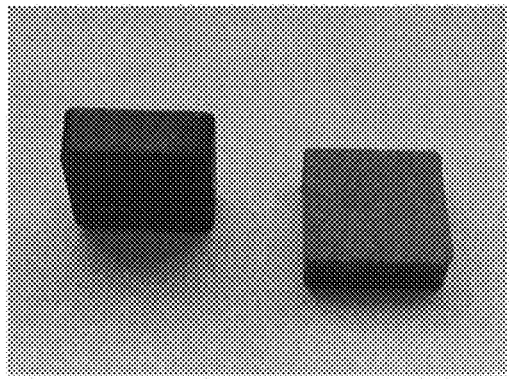
FIG. 7 shows two near net SNMA inserts after HPHT as described in example 2 after having been blasted with the top and bottom part being grounded.

After the HPHT using the same conditions as in Example 1, the inserts may be processed with the shape as shown in FIG. 7, the sintered density was 3.592 g/cm$^3$ which corresponds to 99.5% of the theoretical density.

The hardness was 3044+/−18 HV3 and in XRD the same phases was detected as described in example 2.

FIG. 7 shows two near net SNMA inserts after HPHT as described in example 2 after having been blasted with the top and bottom part being grounded.

Figure 8:
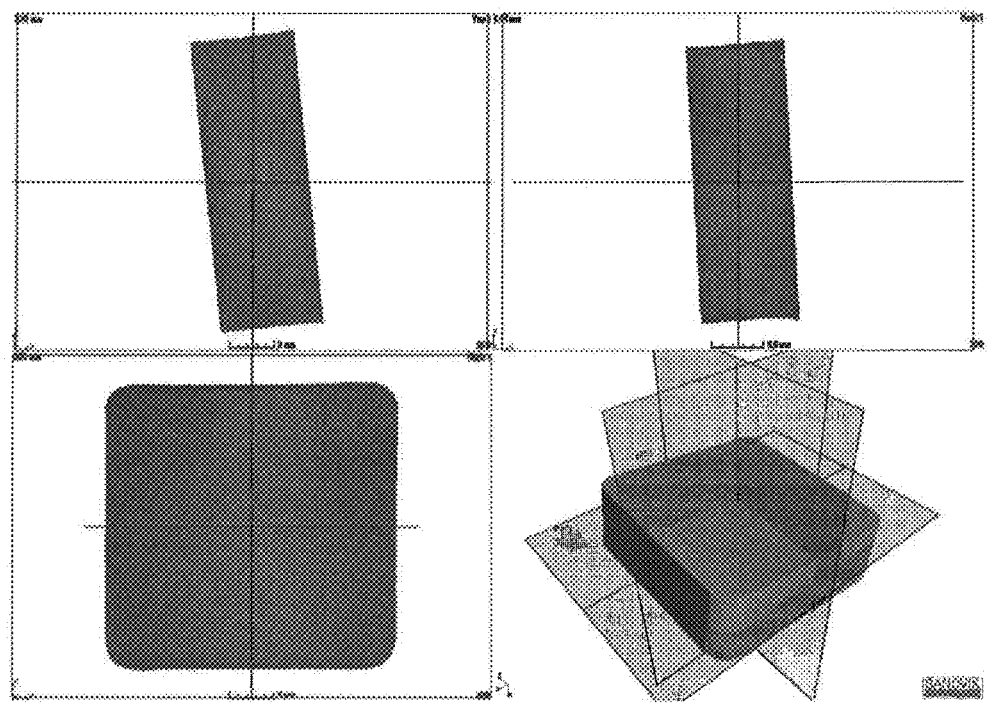
FIG. 8 shows a 2D CT-projection of a fully dense sintered homogenous body free of defects >50 microns manufactured as described in example 2.

One of these fully dense sintered near net bodies have been investigated in the CT. In a 2D-image (FIG. 8) insert is shown that the body is homogenous and free from defects >50 mu. The CT scans were collected, re-constructed and analyzed as described in example 1.

Example 3

Prior Art—BZN7100

A powder mixture consisting of a cBN material were made by mixing and milling 72 wt % cBN, 8 wt % Al, 3.2 wt % Al$_2$O$_3$, 6.4 wt % TiC and 10.4 wt % substoichiometric TiN in an organic milling liquid. The slurry was pan-dried and the powder was then filled in a graphite container and HPHT—processed at 1500-1600° C., 5 GPa and 30 min. forming a solid sintered PCBN disc.

From the PCBN-disc pieces in RNMN geometry were EDM—cut and ground to desired geometry leaving a PCBN skeleton which were not be used or easily re-cycled.

Figure 9:
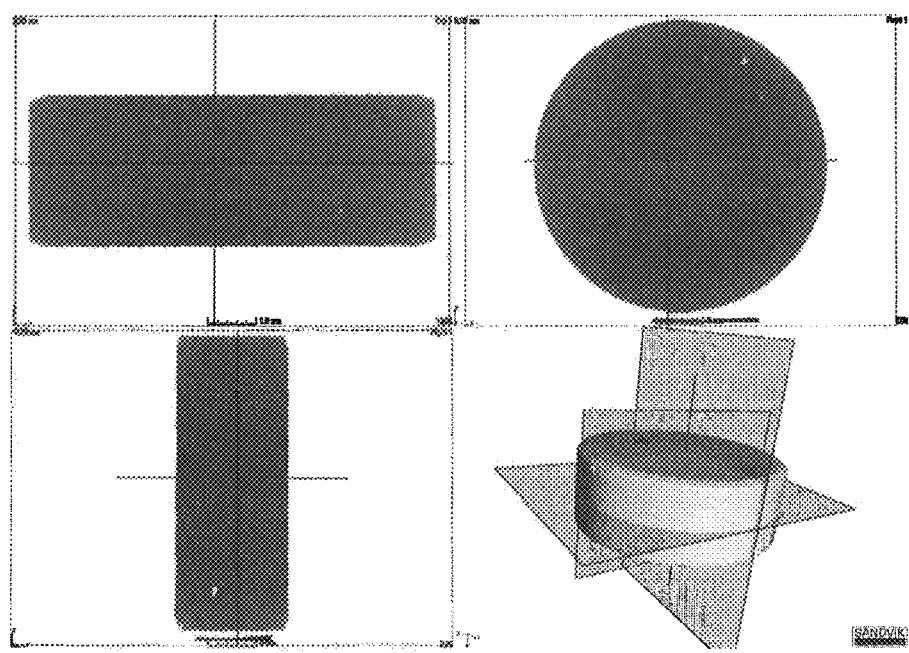
FIG. 9 shows a 2D CT-projection of a fully dense sintered body manufactured according to as described in example 3 (prior art)

The piece had undergone the same investigation in CT as pieces from example 1 and 2 and the result is shown in FIG. 9 and the prior art manufactured inserts have clearly visible defects of heavier inclusions (white spots) that are >50 microns. The CT scans were collected, re-constructed and analyzed as described in example 1.

FIG. 9 shows a 2D CT-projection of a fully dense sintered body manufactured according to as described in example 3 (prior art). The CT image shows that the body is not homogenous and contains heavy inclusions (white spots) larger >50 microns;

Example 4

A near net body of a cBN material was made by mixing and milling 89 wt % cBN, 11 wt % Al, in a milling liquid. The powder mixture was pan-dried and then blended with a 82 wt % ethanol and organic binders PEG300, PEG1500 and PEG4000 were added to an amount corresponding to 22 vol % of the dried powder. The slurry viscosity was carefully controlled prior to the spray drying step. The granulated powder had a good flowability and could easily fill a die during the uni-axial pressing step which was performed in a 30 ton Dorset press. The greens were pressed with maximum allowed force to form a SNMN geometry. The greens were de-bound and pre-sintered in a one step process and the de-binding step was performed during slow ramping under flowing hydrogen up to 500 C and then followed by pre-sintering under vacuum up to 900 C with a holding time of 15 minutes. Upon cooling, the hard green squares were hard and strong, free of cracks and distortions, with dimensions of about 14.60 mm IC and about 7.70 mm thick and a density of 2.1 to 2.3 g/cm3, which corresponds to 65%+/−1% relative density. After pre-sintering the hard green comprised of cBN, Al and a small amount of AlN as shown in the lower diffractogram (900°) in FIG. 26.

The hard greens were containerized by embedding them in graphite powder of size 300 mesh. In one embodiment, several hard greens were set into a die cavity, spaced at least about 3 mm apart, and buried in graphite powder having a particle size of about 22 μm. The graphite powder conformed to the hard green inserts with uniform density between and around the greens so as to enable uniform pressure on the hard greens. The hard greens embedded in graphite powder were compacted at about 300 MPa to form a rigid cylindrical graphite cell with embedded inserts. The graphite density after compacting was about 2.1 g/cm3. A photo of this set-up is shown in FIG. 3.

Next, the graphite cell was machined to fit an available high-pressure high-temperature (HPHT) pressure cell including the usual ceramic insulators and heaters. Once in the HPHT cell, the graphite cell with embedded hard green inserts was sintered in a uni-axial single-action belt press (punches and die) at about 5.5 GPa and about 1600° C. for about 25 minutes according to a standard PCBN sintering cycle. After the HPHT sintering was completed, the graphite cell was broken apart to reveal very hard and fully-dense near-net PCBN inserts. An exemplary near-net PCBN inserts produced by the above-described process is shown in FIG. 7.

The depicted insert shows some distortion in that it is slightly out-of-square (i.e., all of the angles are not exactly 90 degrees) and there is a slight (less than 0.2 mm) of concavity on the periphery. However, no cracks or chips are visible on the insert. Polishing and investigation on optical microscope didn't show any defects >50 microns Density was 3.352 g/cm$^3$, measured by Archimedes' method, which is almost 100% of theoretical density and the hardness was 3160+/−25 HV3.

Figure 27:
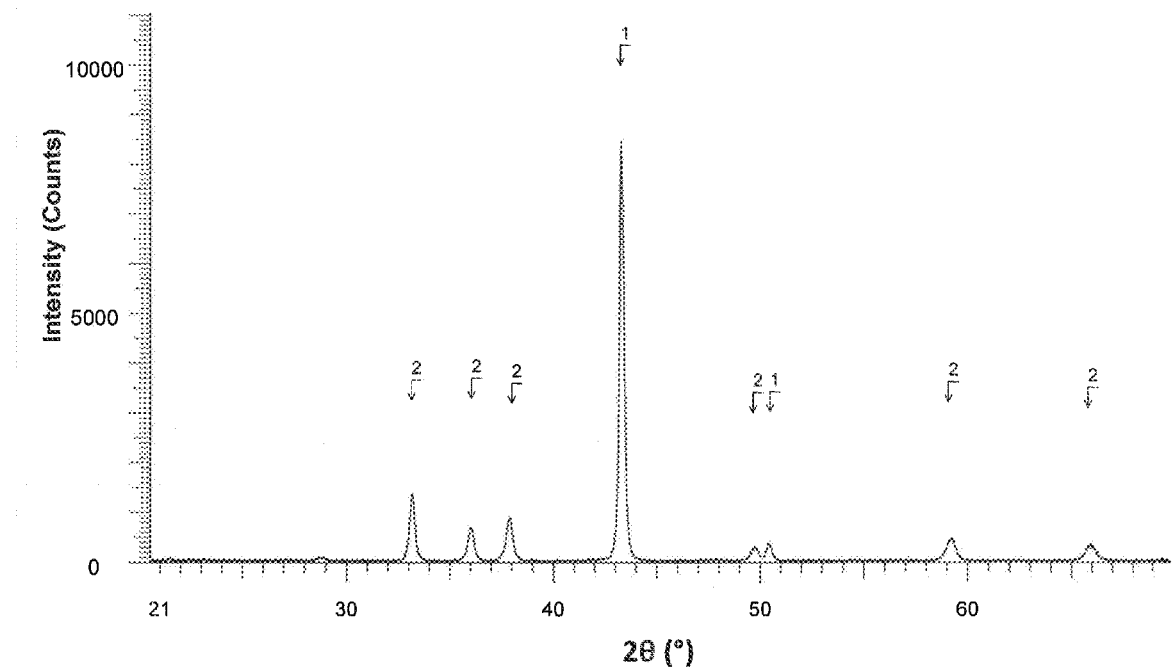
FIG. 27 shows the diffraction pattern of the body described in example 4 after HPHT.

X-Ray diffraction data shows that the final product mainly consist of cBN and AlN as shown in FIG. 27. Figure shows the diffraction pattern for a final sintered insert after HPHT as described example 1. The diffractogram were obtained at room temperature using a XPERT-PRO diffractometer using CuKa-radiation. Data were collected between 20 and 70 degrees in two theta with a step size of 0.008 degrees. Background was subtracted using DIFFRAC Plus Evaluation software. The diffractogram was also corrected for sample displacement using the 111-peak of cBN (PDF No. 00-035-1365) as an internal standard. The reflections in the diffractogram were indexed and the numbers in the drawing corresponds to the following phases:

1=cBN, cubic boron nitride, PDF No. 00-035-1365
2=AlN, PDF No. 00-025-1133

Comparable Example 5

A powder mixture consisting of a cBN material were made by mixing and milling 97 wt % cBN and 3 wt % Al in an organic milling liquid. The slurry was pan-dried. The powder was then filled in a graphite container with an Al-disc below the Al was swept and reacted to AlN during the HPHT process performed at 1600° C., 5.5 GPa for 25 min. In this process the Al-content in the final material varied from powder batch to powder batch depending on the powder density and homogeneity of the powder bed prior to HPHT and infiltration. From the disc pieces in SNMN geometry were laser cut and ground.

Example 6

Performance Data

Figure 10:
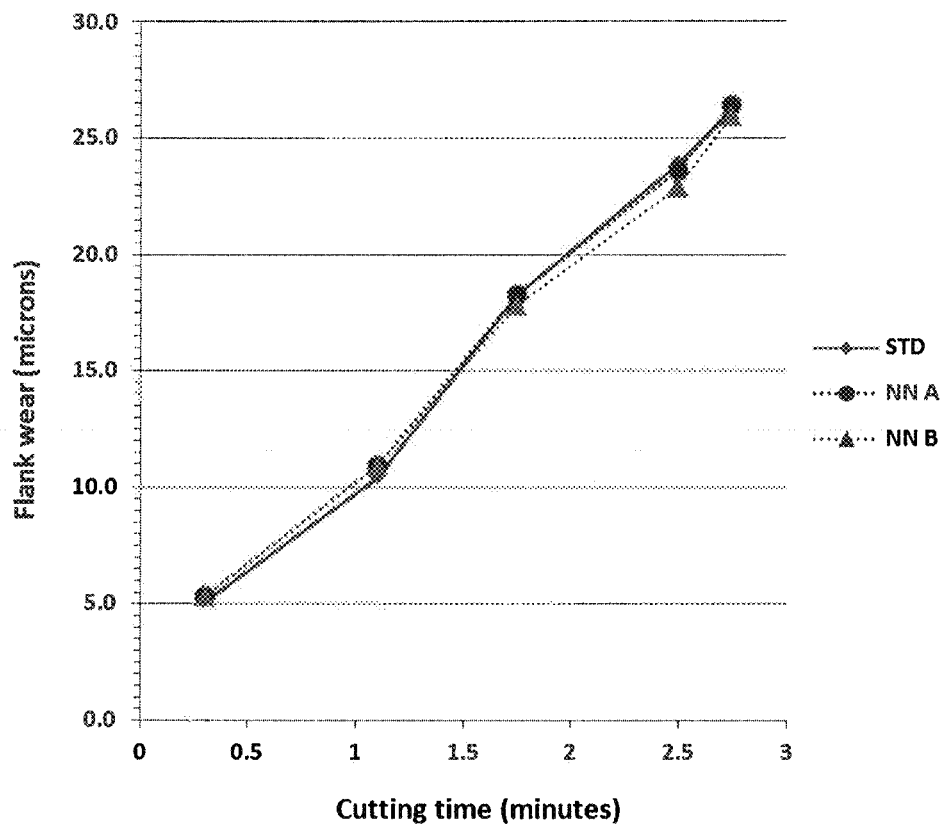
FIG. 10 shows wear resistance data of near net inserts, NN A, and NN B compared to a standard manufactured insert, STD, in ductile iron according to an exemplary embodiment.

SNMN1204 inserts made according to the processes described in example 4 (Near Net A and B inserts) and example 5 (Standard, STD insert) were all-sides ground to produce a chamfered cutting tool having dimensions of about 12.70 mm IC and 4.75 mm thick. The resultant tool was tested by machining cast iron with V=314 m/min, feed=0.03 mm/rev and depth of cut=0.05 mm. FIG. 10 compares the performance of two exemplary near-net inserts with an identical insert produced by conventional laser cutting of HPHT sintered blank material. The results show that the material produced by the near-net process is of the same quality as that produced by the conventional process despite the higher AlN-content, 11 wt % Al, in the Near Net A and B inserts compared to around 7-8 wt % Al in standard made material, STD.

Example 7

Diamond Composite Mining Pick

Diamond, silicon, and silicon nitride powders were blended together to form a uniform mixture using a wet milling process with isopropyl alcohol as the milling fluid. The weight percentages of the mixture were 90% diamond, 9.5% silicon, and 0.5% silicon nitride. The diamond was a mixture of 80% 20 to 30 micron and 20% 4 to 8 micron diamond. The silicon was Alfa Aesar Silicon powder, nodular, APS 1-5 micron, 99.999% (metals basis). The silicon nitride was Alfa Aesar silicon (IV) nitride, alpha phase, 99.5% (metals basis), <1 micron. Slurry was prepared using this mixture 24 vol % PEG as a binder, with water as the fluid. The slurry was spray freeze granulated to produce granules for pressing.

Figure 11:
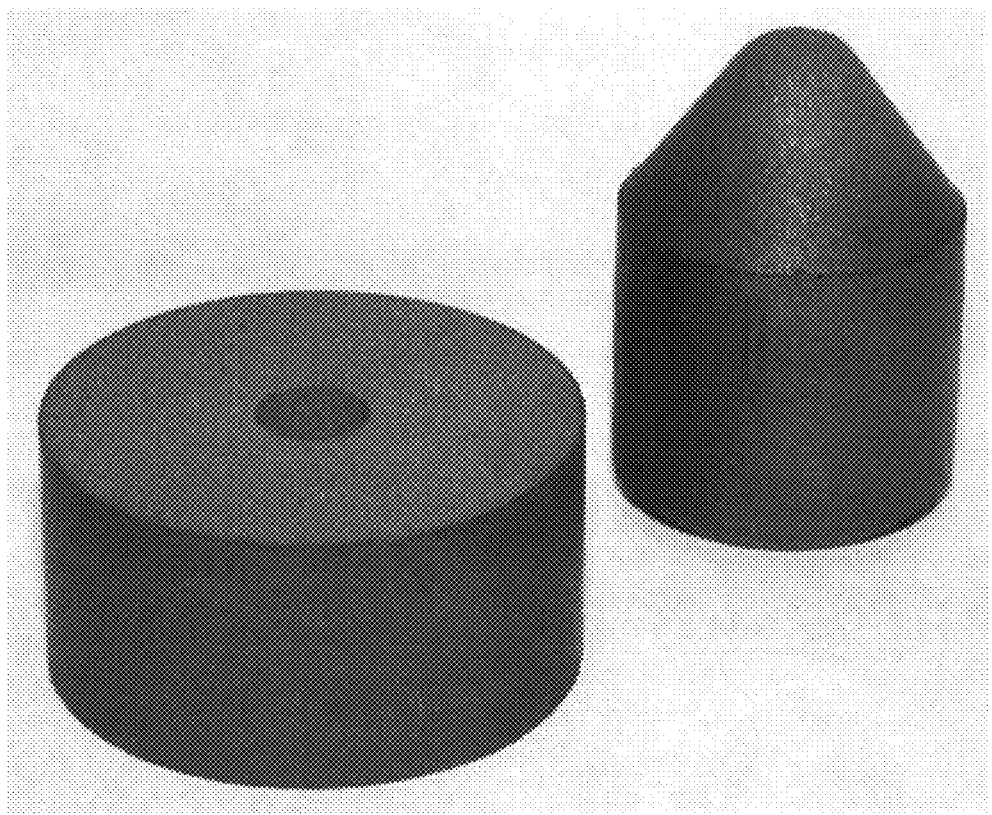
FIG. 11 shows hard greens formed by freeze granulation, uni-axial pressing, de-PEGging in hydrogen to 450° C., and pre-sintering in a vacuum furnace to 1300° C. The pick diameter is 16 mm and the nozzle body diameter is 24 mm.

Granules were used to press in a uni-axial press soft greens in the shape of tool tips typically used in mining operations. The soft greens were heated in the presence of hydrogen to 450° C. to remove the PEG and then further heated in vacuum to between 1300 and 1350° C. to pre-sinter the green, causing partial reaction of silicon with diamond to produce silicon carbide. FIG. 11 shows a picture of the hard green, which measured 16 mm diameter and 22 mm in height.

The hard green was encapsulated in a graphite containment means. Since it was desired to supply additional silicon for infiltration into the composite during HPHT sintering, two silicon discs measuring 16 mm diameter×0.75 mm thickness were placed in a stack in the center of the bottom punch of a press, and the hard green was placed on top of the silicon discs. The die cavity around the hard green was filled with loose graphite flakes, pressed with a pressure of about 175 MPa to consolidate the graphite around the hard green. The weight of graphite and the volume of the containment means were selected to provide a containment means with a density equal to 91% of the density of fully densified graphite. Two such containment means were produced.

Figure 13:
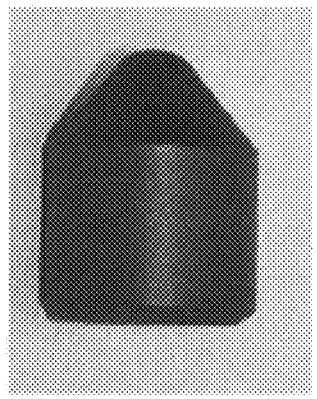
FIG. 13 shows an near-net diamond composite body formed from a hard green body that was HPHT sintered utilizing a containment means. No grinding or other machining operations were performed on the body after HPHT sintering.

The two containment means were arranged within a HPHT cell and sintered at conditions of 3 GPa and 1600° C. The HPHT cell was broken apart and the sintered article was removed from the containment means using a hammer. A final cleaning was performed using a grit blaster with SiC grit. The SiC grit removed graphite from the sintered body but did not abrade the sintered body, indicating the sintered body was well sintered and has a very high hardness and abrasion resistance. The cleaned sintered article is shown in FIG. 13. The densities of the HPHT sintered articles were measured using Archimedes' method and were 3.407 and 3.409 g/cm$^3$. This density is equivalent to the density of similar materials produced without using the inventive process.

Example 8

Diamond Composite Nozzle Body

Diamond slurry and granules were produced using the same method as described in Example 3. Granules were used to press a cylinder measuring 24 mm diameter and 12 mm in height. A drill press was used to drill a central hole measuring 4.8 mm in diameter. The cylinder was then pre-sintered using the same method as described in Example 7. A picture of the hard green is shown in FIG. 11.

A graphite containment means was produced using the same method as described in Example 3, except that no bodies were placed on the bottom punch and a solid graphite cylinder was produced. A cylindrical cavity was machined into each of two graphite containment means so that the cylinder plus two 24 mm diameter×0.75 mm thick silicon discs would fit within the center of the machined cavities. The silicon discs were placed in the base of one cavity in one containment means and the hard green cylinder was placed on top of the silicon discs. Loose powdered graphite was placed into the central hole and compressed manually to fill the hole. The second containment means was placed over the hard green and the assembly was loaded into a HPHT pressure cell.

Figure 14:
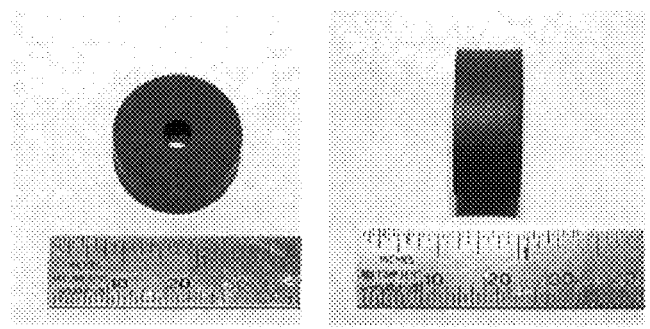
FIG. 14 shows an near-net diamond composite body formed from a hard green body that was HPHT sintered utilizing a containment means. The hole was formed into the soft green body prior to pre-sintering and was filled for HPHT sintering with the same graphite material that was used to produce the containment means. No grinding or other machining operations were performed on the body after HPHT sintering.

The cell was sintered and recovered from the cell using the same methods as described in Example 7. The cleaned sintered body is shown in FIG. 14. The central hole remained intact with minor distortions from cylindricity. There were no cracks in the sintered body. The density of the sintered nozzle was 3.403 g/cm$^3$.

Example 9

Diamond Composite Mining Pick

Figure 19:
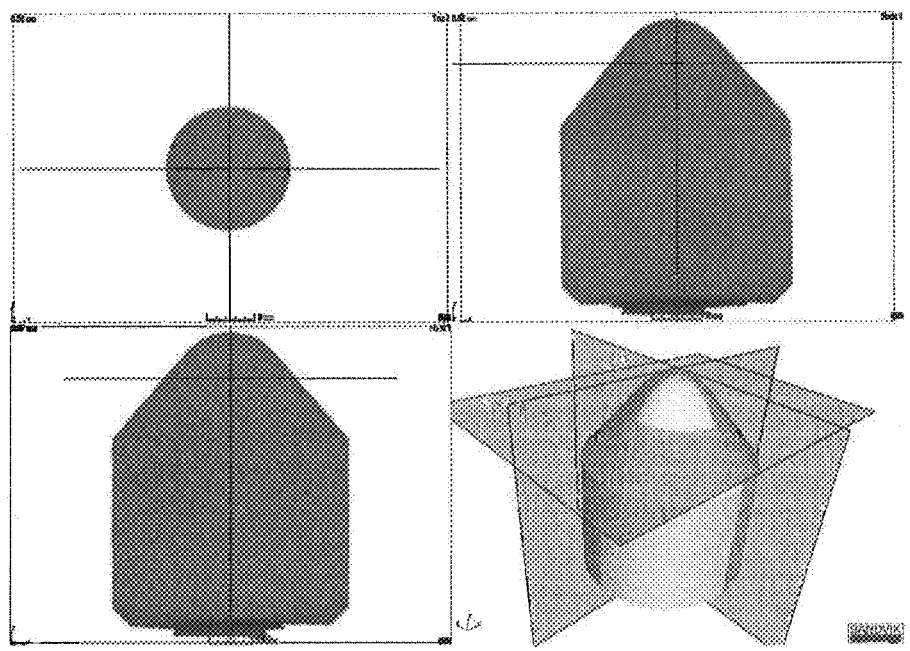
FIG. 19 shows a CT scan of an as-pressed mining pick before testing.

A mining pick was produced using the same method as described in Example 7, except that the silicon powder used was Elkem Silgrain HQ 0.05 Fe<10 micron. The relative density of the soft green pick was 64%. After HPHT sintering the mining pick had a density of 3.419 g/cm$^3$. The cylindrical body of the pick was ground in a centerless grinder to 14.0 mm, the base of the pick was cut to length using a wire EDM, and a 45 deg. chamfer was ground onto the bottom of the pick using a diamond grinding wheel. No grinding or other finishing operations were used to form the conical cutting surface of the pick. A CT scan of the pick before testing is shown in FIG. 19. The CT-system used for these scans were a v|tome|x s240 from GE Sensing and Inspection Technologies, using the following settings:

| Magnification | 16.7 |
| Voxelsize (Resolution) | 12 μm |
| X-ray voltage | 110 kV |
| X-ray current | 120 μA |

-continued

| X-ray filter (Cu) | 0.1 Mm |
| Detector timing | 200 ms |
| Detector averaging | 3 |
| Detector skip | 1 |
| Detector sensitivity | 4 |
| Number of projections | 1200 |

After the CT scans were completed, the projections were reconstructed using datos|x 2.0 from GE Sensing and Inspection Technologies, and then analyzed with Volume Graphics StudioMax 2.1.

Figures 20, 21:
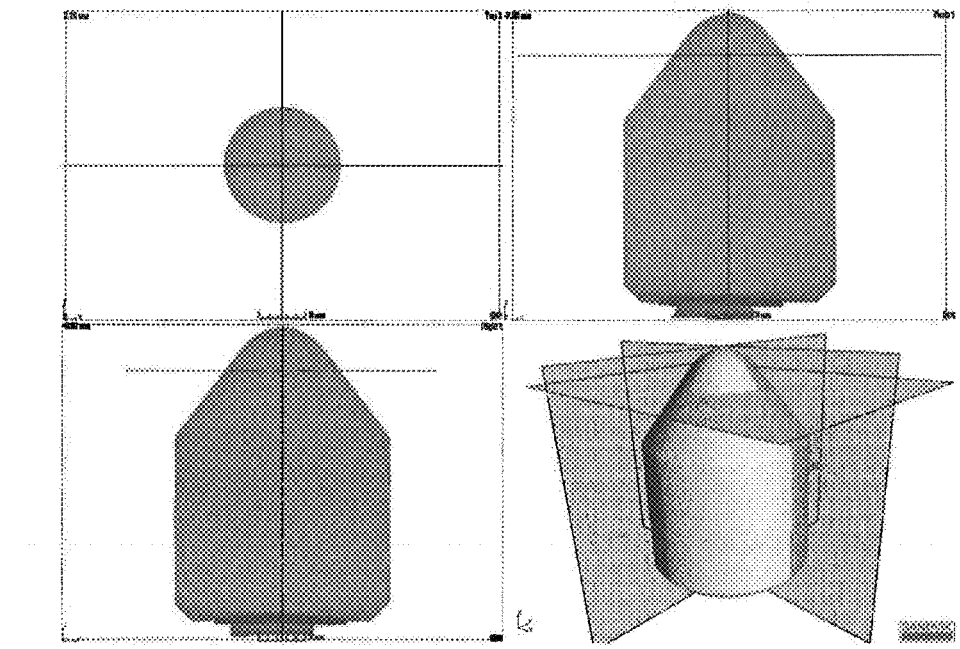
FIG. 20 shows a CT scan of an as-ground mining pick before testing.
FIG. 21 shows mechanical cutting conditions used to test performance of picks in granite cutting.

The pick was mounted for testing by shrink fitting into a steel tool body. One other pick made from the same diamond composite material, but not using the near-net pre-compaction and containment method, was prepared for testing in comparison to the as-pressed pick. The comparison pick was produced by wire EDM cutting the desired shapes from a 35 mm diameter×38 mm tall sintered blank, and by grinding the outside diameter and cutting surface with a diamond grinding wheel. CT scans, using the same settings as given for FIG. 19, of the "as-ground" pick are shown in FIG. 20.

The picks were tested for suitability as a mining cutter by single point mechanical cutting of a granite block. The mechanical properties of this granite block are: unconfined compressive strength (UCS) of 132 MPa, unconfined tensile strength (UTS) of 11.2 MPa, and Cerchar Abrasivity Index (CAI) of 4.1. The point attack angle of the tool was 55 degrees. A total of 12 cutting planes were made using progressively more aggressive cutting conditions. The cutting conditions for the test are given below in FIG. 21. The highest quality commercially available tungsten carbide (WC) mining picks are unable to complete even a single cutting plane under these conditions before being destroyed.

Figure 22:
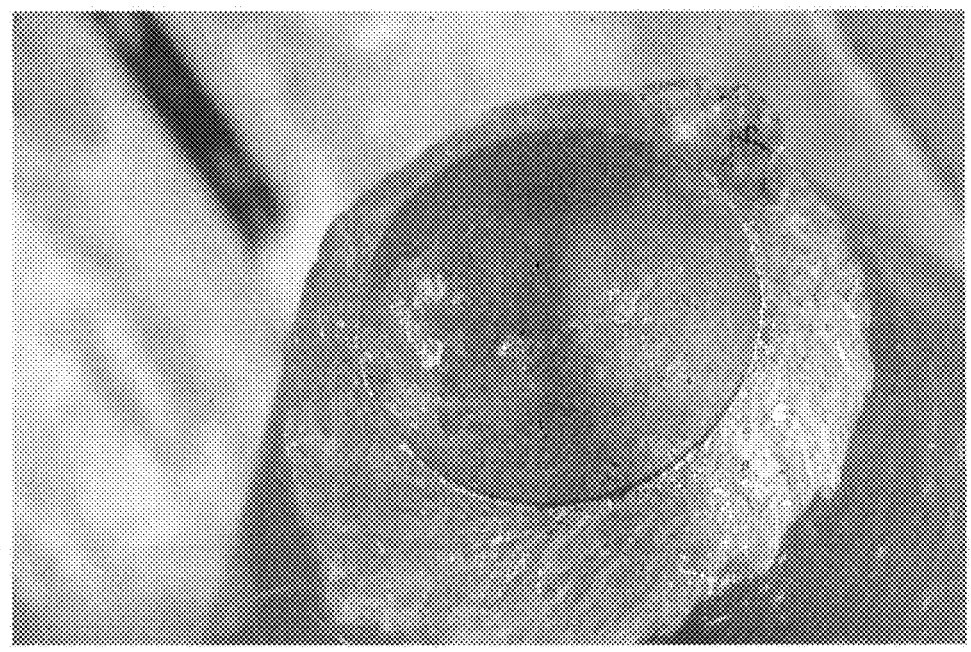
FIG. 22 shows a photograph of the as-pressed mining pick after testing.
Figure 23:
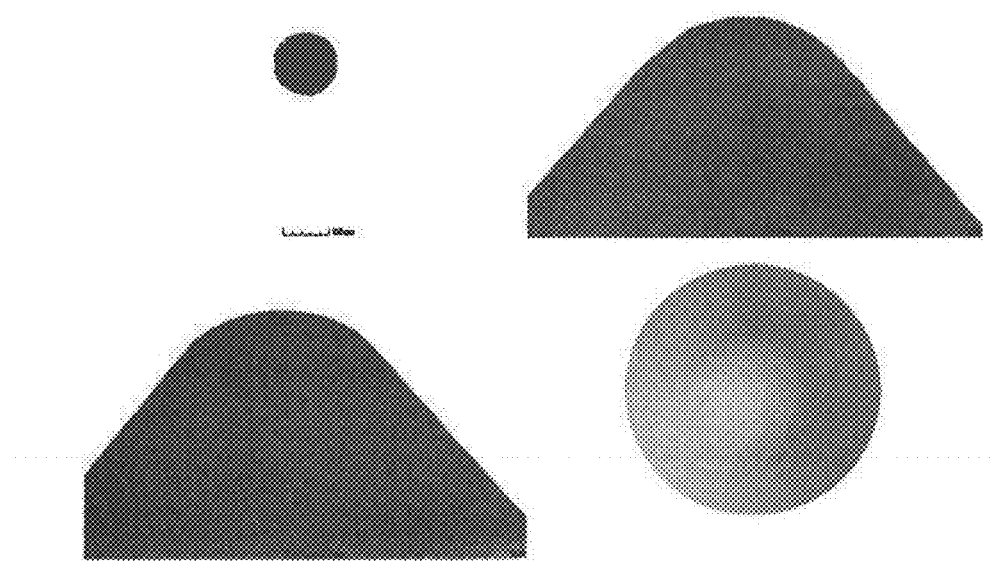
FIG. 23 shows a CT scan of the as-pressed mining pick after testing.
Figure 24:
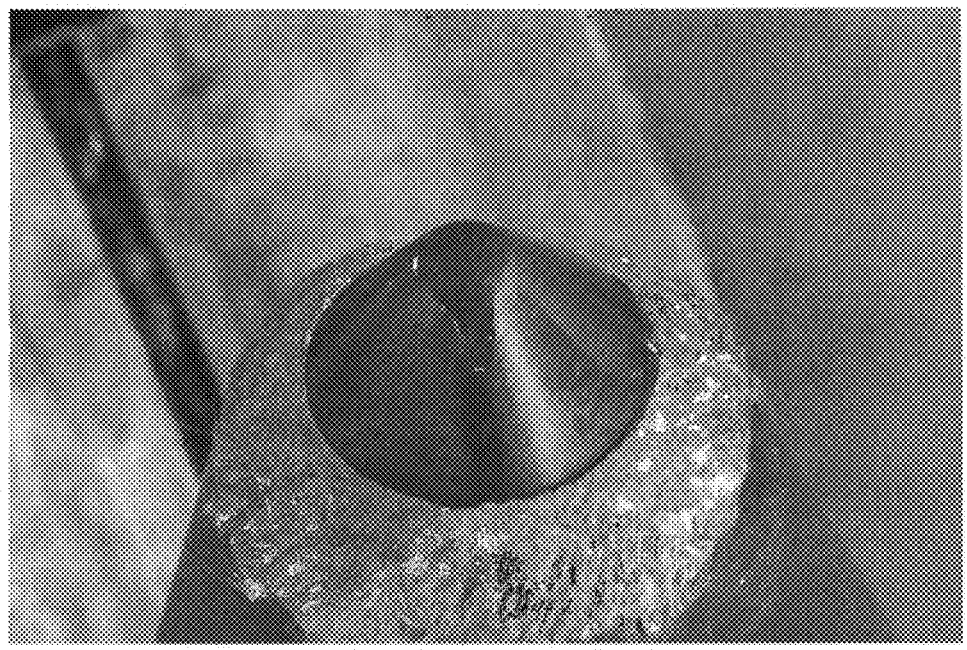
FIG. 24 shows a photograph of the as-ground mining pick after testing.
Figure 25:
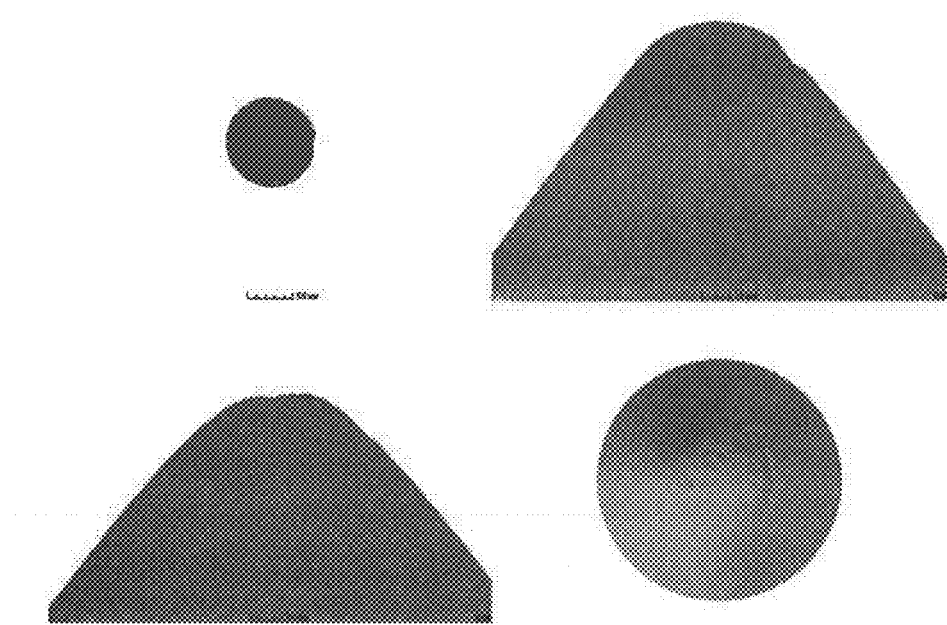
FIG. 25 shows a CT scan of the as-ground mining pick after testing.

A photograph of the as-pressed mining pick after testing is shown in FIG. 22. A CT scan, using the same settings as given for FIG. 19, of the as-pressed mining pick after testing is shown in FIG. 23. There is very little wear and no internal damage as a result of the cutting. A photograph of the as-ground mining pick after testing is shown in FIG. 24. A CT scan, using the same settings as given for FIG. 19, of the as-ground mining pick after testing is shown in FIG. 25. There is a minor amount of wear and no internal damage as a result of the cutting. These results show that the as-pressed mining pick has equivalent performance to a pick of the same material but with a diamond ground cutting surface.

Example 10

Two granulated powders manufactured as described in example 1 (PCBN) except that when manufacturing Powder 2 an addition of 0.52 wt % TEA (Triethanolamine) acting as an dispersing agent was also added to the slurry. The powders were cold pressed to make cylinders having 55 and 59% relative density, organic binders and dispersing agent excluded. The cylindrical pills were single side pressed in and axial strength measured using a Powder Testing Center model PTC-03DT equipment from KZK. The pressed in-die dimensions were OD=12.700 mm and height=10.033 mm. The increase in pressed density from 55% to 59% resulted in an increase in the axial soft green strength from 2.9 MPa to 5.4 MPa.

The 59% relative density cylinders were then de-bound and pre-sintered as described in example 1 and the axial strength of hard green was measured and was found to be significantly higher than the soft green, 49.2 MPa compared to 5.4 MPa for Powder 1 and from 4.7 to 56.1 MPa for Powder 2, respectively.

TABLE 2

| Sample | Pressed relative density (%) | Net pressing pressure (MPa) | Pre-sintering temperature (° C.) | Axial green strength (MPa) | Comment |
|---|---|---|---|---|---|
| Soft green 1 | 55 | 13.5 | — | 2.9 | From Powder 1 |
| Soft green 2 | 59 | 39.7 | — | 5.4 | From Powder 1 |
| Hard green 1 | 59 | 39.7 | 900 | 49.2 | From Powder 1 |
| Soft green 3 | 55 | 13.7 | — | 2.4 | From Powder 2 |
| Soft green 4 | 59 | 38.6 | — | 4.7 | From Powder 2 |
| Hard green 2 | 59 | 38.6 | 900 | 56.1 | From Powder 2 |

Example 11

The granulated powder manufactured as described in example 4 (PCBN) were cold pressed to make cylinders having 59% relative density, organic binders excluded. The cylindrical pills were single side pressed in and axial strength were measured using a Powder Testing Center model PTC-03DT equipment from KZK and the pressed in-die dimensions were OD=12.700 mm and height=10.020 mm. The cylinder were then de-bound and pre-sintered as described in example 1 and the axial strength of hard green was measured and found to be significantly higher than the soft green 80.6 MPa compared to 13.6 MPa.

TABLE 3

| Sample | Pressed relative density (%) | Net pressing pressure (MPa) | Pre-sintering temperature (° C.) | Axial green strength (MPa) | Content |
|---|---|---|---|---|---|
| Soft green | 59 | 78.9 | — | 13.6 | cBN, Al, PEG (as weighed) |
| Hard green | 59 | 78.9 | 900 C. | 80.6 | cBN, Al, AlN (by XRD) |

Example 12

A granulated powder with same composition and manufactured as described in Example 7 was pressed to cylindrical pills having 60% rel. density, organic binder excluded. The cylindrical pills were single sided pressed and axial strength were measured before and after pre-sintering to 1200, 1300, 1350 and 1400° C. as described in Example 7. The pressing and strength measurements were performed using a Powder Testing Center model PTC-03DT equipment from KZK. The pressed in-die dimensions were OD=12.700 mm and height=10.033 mm.

TABLE 4

| Sample | Pressed relative density (%) | Net pressing pressure (MPa) | Pre-sintering temperature (° C.) | Axial green strength (MPa) | Content |
|---|---|---|---|---|---|
| Soft Green | 60 | 65.1 | — | 16.6 | Diamond, Si, Si3N4 and PEG binder (as weighed) |
| Hard green 1 | 60 | 65.1 | 1200 | 10.3 | Diamond, Si, Si3N4, SiC (by XRD) |
| Hard green 2 | 60 | 65.1 | 1300 | 17.2 | Diamond, Si, Si3N4, SiC (by XRD) |
| Hard green 3 | 60 | 65.1 | 1350 | 26.6 | Diamond, Si, SiC, Si3N4 (by XRD) |
| Hard green 4 | 60 | 65.1 | 1400 | 29.2 | Diamond, SiC, Si (by XRD) |

Table 4

Figure 18:
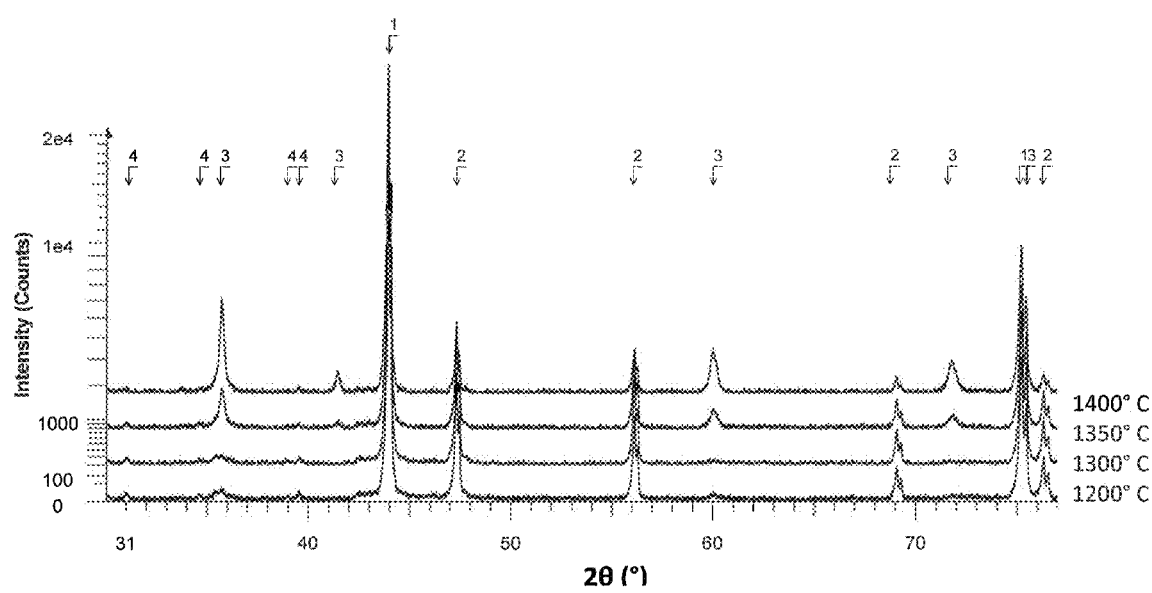
FIG. 18 shows the effect of temperature on the phases present in hard greens sintered at 1200° C., 1300° C., 1350° C. and 1400° C.

In Table 4 it is clearly shown that the green strength is significantly increased by increasing the pre-sintering temperature and thus the amount of SiC formed in the pre-sintering reaction, which is also shown in FIG. 18. Increasing temperature causes an increase in SiC content which is shown by the intensity of the SiC reflections marked as 3 in the figure. The diffractogram were obtained at room temperature using a XPERT-PRO diffractometer using CuKa-radiation. The background were subtracted using DIFFRAC Plus Evaluation software. The diffractogram was also corrected for sample displacement using the 111-peak of Diamond (PDF No. 00-006-0675) as an internal standard. The reflections in the diffractogram were indexed with numbers according to the following:

1. C, Diamond PDF No. 00-006-0675.
2. Si, Silicon, PDF No. 00-027-1402
3. SiC, Moissanite-3C, PDF No. 00-029-1129.
4. alpha-$Si_3N_4$, alpha-silicon nitride, PDF No. 00-041-0360.

Example 13

Figure 26:
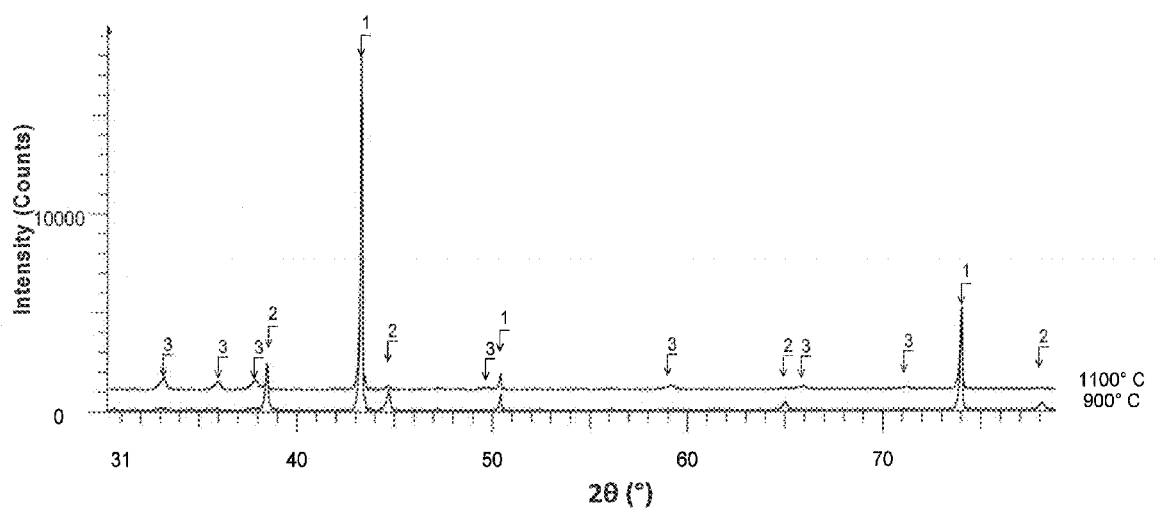
FIG. 26 shows a shows a diffraction patterns for two hard green with composition described in example pre-sintered to about 900° C. and about 1100° C., respectively.

By varying the pre-sintering temperature the composition and green strength prior to HPHT might be varied and optimized for each composition. Below was an example of the pre-sintering reactions for a green as described in example 4 (PCBN 7000) pre-sintered to 900 C and 1100° C. FIG. 26 shows the diffraction patterns for two hard green with composition described in example pre-sintered to 900 C and 1100° C., respectively. The diffractogram were obtained at room temperature using a XPERT-PRO diffractometer using CuKa-radiation. Data were collected between 10 and 95 degrees in two theta with a step size of 0.008 degrees, but in the drawing only the range between 30 to 80 degrees in two theta are shown. Background and CuKa2-peaks were subtracted using DIFFRAC Plus Evaluation software. The diffractogram were also corrected for sample displacement using the 111-peak of cBN (PDF No. 00-035-1365) as an internal standard. The reflections in the diffractogram were indexed and the numbers in the drawing corresponds to the following phases:

1=cBN, cubic boron nitride, PDF No. 00-035-1365
2=Al, Aluminum, PDF No. 00-004-0787.
3=AlN, PDF No. 00-025-1133

As seen in the diffractogram in FIG. 26 at 900° C. the Al had melted and distributed in the hard green but only a very small fraction of AlN had been formed as shown in the bottom X-ray diffractogram. At 1100° C., a significant amount of AlN had been formed (upper X-ray diffroctogram) and only a small amount of Al was remaining to be reacted during the final HPHT step.

Example 14

Figure 12:
FIG. 12 shows a picture of a HPHT cell utilizing a pressed graphite containment means to produce six near-net shape bodies. One side of the cell is exposed to show the near-net shape bodies embedded in the graphite containment means.

Six diamond composite mining picks were made using the same method as described in Example 7, except that rather than encapsulating one hard green body in each containment means, three hard green bodies were encapsulated in each containment means. The containments means were assembled into a high pressure cell and processed using the same conditions as described in Example 7. FIG. 12 shows a picture of the HPHT cell after sintering in which one side of the cell is exposed to show the near-net shape bodies embedded in the graphite containment means.

Example 15

Figure 15:
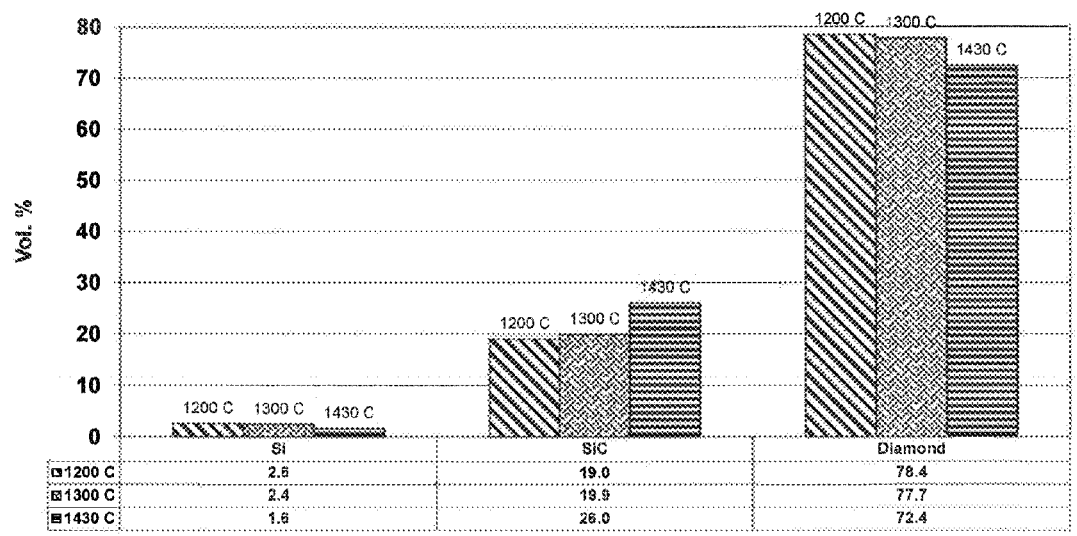
FIG. 15 shows a comparison between the composition of HPHT sintered bodies that were pre-sintered sintered to 1200° C., 1300° C., and 1400° C. The higher pre-sintering temperatures increase the amount of SiC in the sintered product.
Figure 16:
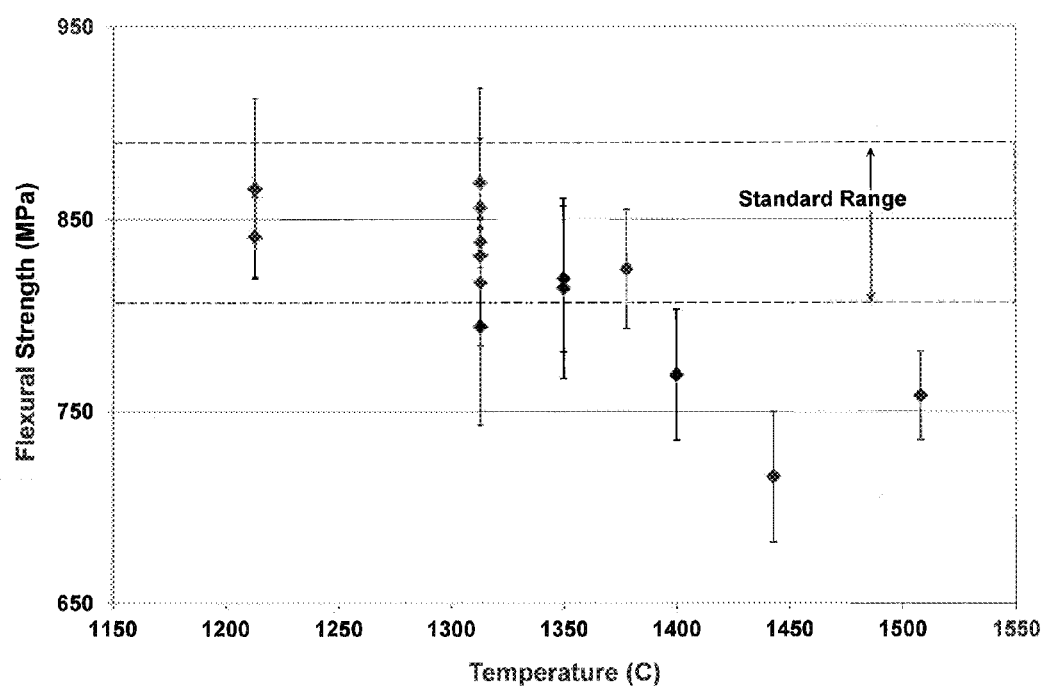
FIG. 16 shows the effect of pre-sintering temperature on the flexural strength of HPHT sintered diamond composite produced using a pressed graphite containment device.
Figure 17:
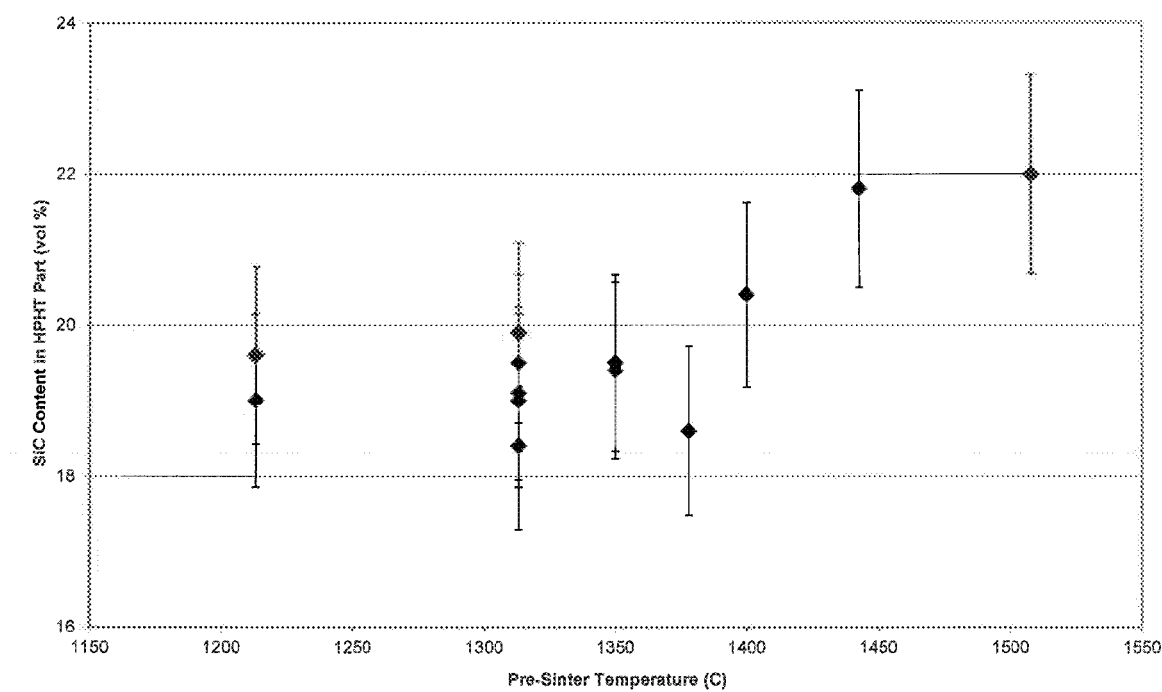
FIG. 17 shows the effect of pre-sintering temperature on the SiC content of diamond composites HPHT sintered diamond composite produced using a pressed graphite containment device.

Fourteen hard green bodies were produced using the same method as described in Example 8, except that no holes were drilled in the hard green bodies before HPHT sintering, and except that pre-sintering was carried out to various maximum temperatures in a range between 1200° C. and 1550° C. Test bars for measuring transverse rupture strength and discs for XRD qualitative scans and quantitative phase analysis were cut from the sintered bodies using a wire EDM machine. XRD quantitative phase analysis was conducted using the "Easy Quantitative Analysis" routine of Jade XRD analysis software. FIG. 15 shows a comparison between the composition of HPHT sintered bodies that were pre-sintered at 1200° C., 1300° C., and 1430° C. FIG. 16 shows the effect of pre-sintering temperature on the flexural strength (transverse rupture strength) of the HPHT sintered bodies. FIG. 17 shows the effect of pre-sintering temperature on the SiC content of the HPHT sintered bodies. FIG. 18 shows the effect of pre-sintering temperature on the phases present in hard green bodies sintered to 1200° C., 1300° C., 1350° C., and 1400° C. Phase 1 is diamond, phase 2 is silicon, phase 3 is silicon carbide, and phase 4 is silicon nitride. Increasing the pre-sintering temperature causes an increase in SiC content. The change in the composition of the hard green bodies alters the final composition and strength of the HPHT sintered bodies. FIG. 17 shows that SiC content in the HPHT sintered bodies is significantly higher above pre-sintering temperatures of about 1400° C. FIG. 16 shows the effect of this composition change on the material strength, which shows a significant decrease above pre-sintering temperatures of about 1400° C.

What is claimed is:

1. A method of making a near-net superhard material body, comprising:
    preparing a slurry from a mixture of materials comprising diamond, silicon, binders, and fluids;
    drying the slurry to remove the fluids and to form granules;
    compacting the granules to form a soft green body of defined shape;
    heating the soft green body in a furnace to remove at least a portion of the binder from the soft green body and to induce a physical reaction or a chemical reaction in a portion of the diamond and the silicon, thereby forming a hard green body;
    embedding one or more of the hard green bodies in a containment powder and compacting the containment powder to form a containment means, the containment powder comprising solid material selected from the group of graphite, sintered cermet and combinations thereof;
    sintering the hard green bodies that are positioned within the containment means in a high pressure and high temperature process and providing additional silicon that infiltrates the hard green bodies, wherein the diamond reacts with the silicon introduced in the slurry and during the high pressure and high temperature process to form silicon carbide that bonds diamonds in one or more near-net bodies from the hard green bodies.

2. The method in claim 1, wherein the granules comprise a mixture comprising diamond, silicon, and a temporary organic binder.

3. The method of claim 1, further comprising a ceramic material.

4. The method in claim 1, wherein the granules comprise a mixture of diamond and a carbide-forming metal or carbide-forming semi-metal, a ceramic material, and a temporary organic binder.

5. The method of claim 1, wherein the binder comprises polyethylene glycol.

6. The method of claim 1, wherein the containment powder surrounds the hard green body to enable uniform distribution of pressure during the high-pressure high-temperature sintering process.

7. The method of claim 1, wherein the containment means has equal or higher relative density than the hard greens prior to the high-pressure high-temperature sintering process.

8. The method of claim 1, wherein the hard green bodies that are positioned within the containment means are sintered at a pressure of at least about 1.5 GPa and a temperature of at least about 1200° C.

9. A method of making a near-net superhard material body comprising:
    preparing a slurry from a mixture comprising diamond, silicon, binders, and fluids;
    drying the slurry to remove the fluids and to form granules;
    compacting the granules to form a soft green body of defined shape;
    heating the soft green body in a furnace to remove at least a portion of the binder from the soft green body and to induce a physical reaction or a chemical reaction in a portion of the diamond and silicon, thereby forming a hard green body;
    inserting one or more of the hard green bodies in a containment means for containing said hard green bodies, the containment means comprising solid material selected from the group of graphite, sintered cermet and combinations thereof;
    sintering the hard green bodies that are positioned within the containment means in a high pressure and high temperature process and providing additional silicon that infiltrates the hard green bodies, wherein the diamond reacts with the silicon introduced in the slurry and during the high pressure and high temperature process to form silicon carbide that bonds diamond in one or more near-net bodies that are formed from the hard green bodies.

10. The method of claim 9, wherein the binder comprises polyethylene glycol.

11. The method of claim 9, wherein the containment means is separated from the hard green bodies by an inert layer such as mica, mica foil, hBN or TiN.

12. The method of claim 9, wherein the hard green bodies that are positioned within the containment means are sintered at a pressure of at least about 1.5 GPa and a temperature of at least about 1200° C.

13. The method of claim 9, wherein the hard green body comprises features selected from the group of indentations, holes, depressions, ridges, radii, conical surfaces, chamfers, helix shapes, screws and combinations thereof.

14. An insert produced by the method of claim 9.

15. The insert of claim 14, wherein the insert contains gradients of materials.

16. The method of claim 1, wherein the binders comprise a matrix binder and temporary organic binders, and when the soft green body is heated, the temporary organic binders are removed from the superhard powder and the matrix binder.

17. The method in claim 9, wherein the granules comprise a mixture of diamond, silicon, a ceramic material, and a temporary organic binder.

18. The method of claim 9, wherein the containment means has equal or higher relative density than the hard greens prior to the high-pressure high-temperature sintering process.

19. The method of claim 9, wherein the binders comprise a matrix binder and temporary organic binders, and when the soft green body is heated, the temporary organic binders are removed from the superhard powder and the matrix binder.

20. A method of making a near-net superhard material body, comprising:
    preparing granules from a mixture of materials comprising diamond, a matrix binder, and temporary organic binders;
    compacting the granules to form a soft green body of defined shape;
    heating the soft green body to remove the temporary organic binder from the soft green body and to physically react or chemically react a portion of the diamond with the matrix binder to form a hard green body;
    inserting one or more of the hard green bodies in a containment means for containing said hard green bodies;
    sintering the soft green bodies that are positioned within the containment means in a high pressure and high temperature process and providing additional matrix binder that infiltrates the hard green bodies, wherein the diamond reacts with the matrix binder introduced in the slurry and during the high pressure and high temperature process to form a continuous matrix that bonds diamonds in one or more near-net bodies that are formed from the hard green bodies.

21. The method in claim 20, wherein the matrix binder is selected from the group consisting of a carbide-forming metal and carbide-forming semi-metal.

22. The method of claim 20, wherein the containment means comprises solid material selected from the group consisting of graphite, sintered cermet and combinations thereof.

23. The method of claim 22, wherein the containment means is separated from the hard green bodies by an inert layer selected from the group consisting of mica, mica foil, hBN and TiN.

24. The method of claim 20, wherein the one or more of the hard green bodies are embedded in a containment powder, which is compacted to form the containment means, the containment powder comprising solid material selected from the group of graphite, sintered cermet and combinations thereof.

* * * * *